(12) United States Patent
Luxen et al.

(10) Patent No.: US 9,709,390 B2
(45) Date of Patent: Jul. 18, 2017

(54) METHOD AND A DEVICE FOR THE INSPECTION OF SURFACES OF AN EXAMINED OBJECT

(71) Applicant: ISRA VISION AG, Darmstadt (DE)

(72) Inventors: Marc Luxen, Aachen (DE); Jan Erxleben, Wuerselen (DE)

(73) Assignee: ISRA VISION AG, Darmstadt (DE)

( * ) Notice: Subject to any disclaimer, the term of this patent is extended or adjusted under 35 U.S.C. 154(b) by 231 days.

(21) Appl. No.: 14/401,211

(22) PCT Filed: May 14, 2013

(86) PCT No.: PCT/EP2013/059855
§ 371 (c)(1),
(2) Date: Nov. 14, 2014

(87) PCT Pub. No.: WO2013/171176
PCT Pub. Date: Nov. 21, 2013

(65) Prior Publication Data
US 2015/0130927 A1    May 14, 2015

(30) Foreign Application Priority Data

May 16, 2012 (DE) .................. 10 2012 104 282

(51) Int. Cl.
*G01B 11/30* (2006.01)

(52) U.S. Cl.
CPC ............ *G01B 11/30* (2013.01); *G01B 11/303* (2013.01)

(58) Field of Classification Search
CPC ..... G01B 11/25; G01B 11/00; G01B 11/2518; G01B 11/254; G01B 11/2545; B41F 33/0036; G01N 21/8806; G01N 21/8901; G01N 2201/0635

USPC ........ 348/92, 128; 356/237.1, 445, 600, 604
See application file for complete search history.

(56) References Cited

U.S. PATENT DOCUMENTS

| 5,646,733 | A  | 7/1997  | Bieman        |
| 5,894,345 | A  | 4/1999  | Takamoto et al. |
| 6,501,554 | B1 | 12/2002 | Hackney et al. |
| 6,639,685 | B1 | 10/2003 | Gu et al.     |

(Continued)

FOREIGN PATENT DOCUMENTS

| CN | 1182211 | 5/1998 |
| CN | 1919157 | 2/2007 |

(Continued)

OTHER PUBLICATIONS

Batlle J., et al: "Recent Progress in Cided Strurctured Light . . . "Pattern Recognition, Elsevier, GB, BD. 31, NR. 7, Jul. 31, 1998, pp. 963-982.

(Continued)

*Primary Examiner* — Nathnael Aynalem
(74) *Attorney, Agent, or Firm* — Michael J. Striker

(57) ABSTRACT

A method and a device for the inspection of surfaces of an examined object includes illuminating a the surface using an illumination unit and capturing an image of the surface using an area image sensor. The captured images are forwarded to an image analysis unit configured to ascertain surface anomalies as defect areas and delimit, if required, the defect areas in a segmentation relative to one another or against the image background, to summarize defect areas belonging together in a regional analysis, to derive characteristic defects from defect areas or defect regions in a feature extraction or both.

12 Claims, 2 Drawing Sheets

(56) References Cited

U.S. PATENT DOCUMENTS

| | | |
|---|---|---|
| 2005/0238237 A1 | 10/2005 | Haeusler et al. |
| 2009/0080036 A1 | 3/2009 | Paterson et al. |
| 2009/0116023 A1 | 5/2009 | Wadman |
| 2009/0135434 A1 | 5/2009 | Keranen |
| 2009/0136114 A1 | 5/2009 | Wu et al. |

FOREIGN PATENT DOCUMENTS

| | | |
|---|---|---|
| CN | 101776452 | 7/2010 |
| CN | 101865661 | 10/2010 |
| CN | 102288131 | 12/2011 |
| CN | 102288613 | 12/2011 |
| DE | 102 07 574 | 9/2003 |

OTHER PUBLICATIONS

Chen, S., et al: "Self-Recalibration of a Colour-Encoded Light System . . . " Measurement Science and Technology, IOP, Bristol, GB, BD. 14, NR. 1, Nov. 21, 2002, pp. 33-40.

Molleda, J., et al: "Real-Time Flatness Inspection of Folled Products Based on Optical Laser . . . " SPIE, Bellingham, WA, USA, BD. 19, NR. 3, Jul. 14, 2010, pp. 1-14.

Caulier, Y., et al:"Am Image Content Description Technique for the Inspection of Specular Objects" Internet Citation, BD. 2008, 195263, Jul. 31, 2008, pp. 1-14.

Jing Xu et al:"Real-Time 3D Shape Inspection System of Automotive Parts Based on Structured Light Pattern" Optics & Laser Technology 43, 2001, 1-8M Elsevier, USA.

METHOD AND A DEVICE FOR THE INSPECTION OF SURFACES OF AN EXAMINED OBJECT

CROSS-REFERENCE TO RELATED APPLICATION

The invention described and claimed hereinbelow is a National Stage Application of PCT/EP2013/059855, filed May 14, 2013 (the PCT application), under 35 USC §371. The PCT application claims priority from German Patent Application DE 10 2012 104 282.9, filed on May 16, 2012. The German priority application and the PCT application are incorporated herein by reference and provide the basis for a claim of priority of invention.

BACKGROUND OF THE INVENTION

The invention relates to a method and a device for the inspection of surfaces of an examined object, where the surface is illuminated by means of an illuminating unit and captured by at least one area image sensor. The area image sensor may, in particular, be an area scan sensor also called a matrix camera, where an image detail is associated with one pixel of the area scan camera, where one pixel of the picture taken assumes a value which is characteristic of the image detail taken. The values may, in particular, be intensity values, wherein the picture may be captured in a monochromatic manner (for example as a grey value image, an infrared image or a monochrome image) as well as a in a polychromatic manner (color picture). The color is defined by the intensity values of the color sensors associated with the respective pixel of the matrix camera or the area image sensor, e.g. red, green, blue, infrared and/or similar wavelength-selective color sensors. According to the invention the area image sensor or the matrix camera shall preferably not be a line scan camera with only one image line, i.e. several pixels adjacent to each other in one row forming one image line.

In the proposed inspection method the images captured are forwarded to an image analysis unit, which is configured to ascertain surface anomalies as defect areas in a detection, in particular by means of image evaluation programs. To this end the image evaluation programs comprise suitable algorithms for evaluating individual pixels or pixel areas of, for example, the intensity values of the color sensors assigned to the individual pixels. The color sensors may be one sensor for a monochrome image or several sensors for a color image. As required, in the image analysis unit, the defect areas may also be delimited in a segmentation in particular by means of image evaluation programs, in relation to each other or against the image background, defect areas belonging together are summarized in a region analysis in particular by means of image evaluation programs, and/or characteristic defect features are derived from defect areas or defect regions in a feature extraction in particular by means of image evaluation programs, which then are or may be used for a subsequent defect classification.

With the invention the area image sensor is calibrated three-dimensionally onto a selected coordinate system. "Three-dimensionally calibrated" means that the arrangement, i.e. the position and the orientation of the area image sensor as well as its imaging properties in e.g. a camera model, are known, so that, by utilizing suitable features known in the selected coordinate system and/or in another coordinate system, which are mapped in the picture taken, it is possible to determine the position of these features and/or the captured object examined or to be examined. For example these features may be characteristic features of the object, which are known in an object coordinate system. Such image evaluation methods are generally known and therefore need not be described here in detail.

When carrying out the method proposed according to the invention the object examined or to be examined is moved with its surface relative to the preferably stationary area image sensor in the selected coordinate system. The selected coordinate system may for example be the world coordinate system of the environment.

The invention thus relates to systems for a high-resolution, comprehensive and contactless capture of the form properties and reflective properties of objects in conjunction with methods for data fusion and data analysis for the inspection of medium-area or large-area surfaces in the material-production or material-processing industry. Such systems permit the capture of reflective properties of surfaces in real time and can be used as surface inspection systems for surface quality inspection as well as for process analysis and process control.

The known systems for a contactless inspection of medium-area or large-area surfaces are limited to the sensory capture of the reflective properties of the surface and for this purpose make use of two-dimensional scanning of the surface using an image sensor, such as a CCD element with an imaging optics which maps the image area to be captured onto the CCD element. These image sensors are also called cameras.

The reflective properties are measured with the aid of a two-dimensional image of the surface, which is captured by black-and-white or color cameras with monochromatic or polychromatic (colored) illumination and, as required, using suitable optical filters. The cameras used may be area-scan or line-scan cameras in conjunction with appropriate illuminating units. The illumination and viewing angles as well as the used illumination wavelengths (monochromatic or polychromatic) are adapted to suit the respective inspection task. The image sensor used supplies a continuous data stream of single- or multi-channel images, wherein the image information (in particular intensity values for one or different wavelengths) is available as single- or multi-channel information for each pixel or each pixel area of the area-scan camera.

To locate, evaluate and categorize surface defects the captured image (grey-scale image or color image) is subjected to an automatic image analysis, during which image analysis algorithms initially discover surface anomalies (detection), delimit the defect areas in relation to each other and to the background (segmentation) and, as required, summarize defect areas belonging together (region analysis). In order to categorizes and evaluate the recognized surface anomalies into application and surface-specific defect classes, characteristic image features are derived from the image function within the defect regions (feature extraction). Then, in a classification process each found conspicuity is assigned a defect category and, depending on the respective application, a degree of severity. Conspicuities not evaluated as surface defects, are classified as so-called "pseudo defects".

The information content of a two-dimensional image of the surface to be examined, as obtained by the known systems for surface inspection, is however limited. Certain surface properties are simply not suitable for measuring reflection properties. Also intensity or color information, even for an optimal sensor construction and an optimal data evaluation, do not supply sufficient evidence for a reliable separation between flawed and flawless surface structures. For example, for extremely heavily structured surfaces, such as slab surfaces, a large number of pseudo defects is frequently observed independently of the detection process as such, since the generally uncritical material structures show up as en-masse conspicuities in a color or intensity image, which are detected as surface anomalies and thus as defect areas.

With the known inspection processes therefore conspicuities show up all over the material surface, when in effect these are not surface defects but commonly known material structures. On the other hand relevant surface anomalies such as cracks or indentations are difficult to distinguish from these pseudo defects by way of the intensity or color picture. For the downstream classification process therefore it is possible only with a great deal of uncertainty to differentiate between actual defects and pseudo-defects, leading, depending on the inspection task, to a considerable amount of false alarms which results in a considerable amount of manual reworking.

SUMMARY OF THE INVENTION

It is therefore the requirement of the present invention, to improve the reliability of defect recognition during the inspection of surfaces and in particular for heavily structured surfaces, to reduce the number of detected pseudo-defects.

According to the invention, provision is made, in particular, that by means of a projection unit three-dimensionally calibrated onto the selected coordinate system, a pattern is projected onto an area of the surface of the image, which is captured by the area image sensor, and that the position of defined pattern portions of the projected pattern on the surface of the object is determined in the selected coordinate system and translated, as required, into another coordinate system, for example into the object coordinate system.

Projecting the pattern onto the area of the surface makes is possible to capture the structure of the surface as depth information in a desired resolution, which is limited by the resolution of the area image sensor, and at the same time, to use it together with the captured color or intensity information in each pixel for the detection and classification of defect areas. According to the invention this results in a significant improvement in the detection performance, because due to the simultaneous capture, fusion and analysis of the high-resolution two-dimensional intensity and color images together with the structure images, additional information (depth information) for evaluating the anomalies is available. According to the invention the structure information can be generated with a lower, equal or higher resolution than the intensity or color information.

"Three-dimensional calibrated projection unit", according to the present invention, means that the shape of the plane formed by the projection of the pattern in space is known and that this can form a straight (planar) or curved plane depending on the type of pattern. In the case of a projected line as a pattern, the shape of the plane is therefore a planar plane. With other patterns curved planes or plane shapes may consist of several planes arranged in a defined manner to each other, such as for a projected cross pattern or several spaced-apart lines (striped pattern).

The defined pattern portions are partial sections of the projected pattern as a whole, wherein the size of the pattern portions, the position of which is being determined, can be chosen corresponding to the desired resolution, with which the run of the surface of the object, which can be determined by the pattern projected onto the surface, shall be known. The limit and measure for the resolution is the pixel size of the area image sensor, wherein a pattern portion can correspond in its longitudinal and/or transverse extension to just one pixel or to several combined pixels of the area image sensor.

Moving the surface past the area image sensor is preferably achieved, according to the invention, by means of a transport unit calibrated onto the selected coordinate system, which permits a defined movement of the surface relative to the area image sensor and the projected pattern. A benchmark for the speed of the movement in conjunction with the image capture speed is the desired resolution.

A preferred application of the invention is effected in the reflection arrangement in which the area image sensor captures the light of the illuminating unit reflected on the surface.

According to a preferred embodiment of the invention a depth profile of the surface is ascertained from the determined positions of the pattern portions.

Individual positions of the pattern portions on the surface are determined by means of a triangulation evaluation known as such, which is based on the fact that the projection unit and the camera are calibrated three-dimensionally onto the selected coordinate system.

Thus an improvement of the overall performance of the surface inspection system according to the invention is achieved by supplementing the captured reflexive surface data by depth information, wherein this is based on the simultaneous capture and analysis of two-dimensional images representing the reflection properties of the surface and three-dimensional images representing the three-dimensional geometry of the surface as depth edges (surface topography). By utilizing the additional depth information which is available as a depth profile of the entire surface in terms of a surface topography for the entire surface, detection reliability, accuracy of defect positioning and classification are improved and the defect description is supplemented by information about the defect topography.

On highly structured surfaces in particular this allows the rate of false alarms to be minimized because certain patterns in the two-dimensional image evaluating the reflection properties of the surface can be explained by depth information which reflects a normal structure of the surface. Besides due to a three-dimensional visualization of both surface defects and the surfaces as a whole, illustration of conspicuities can be improved.

According to a preferred embodiment of the above-described method the pattern projected may be a line pattern (consisting of exactly one line) or a stripe pattern (consisting of at least two lines), wherein both the line pattern and the stripe pattern are generated by a projection unit configured as a stripe projector.

According to the invention therefore the surface topography is preferably captured according to a light-section process utilizing such a stripe projection. Whilst the surface to be inspected is moved past the sensor the projection unit maps the pattern being created from one or more lines onto the surface. The pattern is mapped into the light-sensitive surface of a matrix camera (i.e. the pixels of the area image sensor), and the image information being created is used for deriving linear depth profiles of the surface. This means that the depth information is captured profile by profile.

An areal three-dimensional model of the surface is created by successively capturing and stringing together individual line profiles. The line capture speed is preferably adjusted to the feed rate of the surface relative to the area image sensor such that the depth is measured at a constant lateral resolution. Any gaps occurring due to shading are thus either small or could possibly be avoided by using further area image sensors (cameras).

The lines can preferably be configured as straight lines because then evaluation is particularly simple. The line width corresponds to the desired resolution, and the movement of the surface relative to the projected line is preferably effected transversely to the line direction. Preferably the line width is larger than the resolution of the images in the matrix camera or in the direction of movement, in order to ensure that also those patterns show up as areal regions in which surface defects can be evaluated.

The special advantage of the present invention thus consists in the selection (adapted for medium-area and/or large-area surfaces) of a combination of projection unit and area image sensor, where both illuminating units, i.e. the illuminating unit for capturing the reflection properties of the surface and the illuminating unit for the projection of the pattern (projection unit) for capturing the depth information, are possibly even identical, and where both the depth information and the information on reflection properties of the surface can be ascertained with one and the same area image sensor and preferably from one and the same image with sufficient speed.

Depending on which illumination is used for generating the light section, the image for capturing the reflection properties is composed of the respectively illuminated parts. Integration may be effected across several pixels in order to suppress interferences. The result is a N+1-channel image, where N-channels contain the information on reflection properties of the surface and where the N+1-th channel contains the depth information thus forming the depth image. There is thus created an exact local match between the color image and the depth image, i.e. each image section of the color image (e.g. one pixel), which contains the information on the reflection properties of the surface, has thus already directly assigned to it in the sensor, the associated depth information.

According to the invention the depth information can now be used together with the information on the reflection properties, in order to recognize defects on the material surface which are distinguished only by their topography or topology such as cracks or indentations. This permits a reliable detection and classification of topographical defects. In particular for the purpose of classification, there is thus distinctly more information available according to the invention than with conventional inspection systems, in order to achieve a clear separation between surface defects and pseudo defects or between stains and topographical defects and to classify the surface defects according to their degree of severity.

According to the invention the pattern may be projected as a bright area, preferably as a line with dark intermediate spaces. In this case determination of the position of the pattern portion from the three-dimensional image and the detection of defect areas in the two-dimensional image of the surface can coincide in a particularly simple manner, i.e. occur in the identical image area. In principle it is of course also possible that the image areas are separate, in that in an area of the projection pattern different from the pattern a window for illuminating the surface is left blank. This can be achieved in a particularly simple way by a stripe projection, where all light except for the stripes is left blanked out. Alternatively the light may not be blanked out in a separate two-dimensional image area, in order to have an image area for the detection of defect areas, which is preferably offset in a direction transversely to the longitudinal direction of the projected pattern.

In an alternative development it is possible according to the invention for the pattern to be projected as a dark area, preferably as a line with bright intermediate spaces. In this case the position of the pattern portion and of the two-dimensional image of the surface for the detection of surface defects is determined separately, or possibly directly adjacent to one another or overlapping (for a light-dark field surface inspection), in that the dark area is jointly used as a dark field. In this case the projection pattern is configured so as to be transparent with a darkened pattern area for the projection, wherein even the dark area can allow some light to shine through so that this dark area also does not lie on the edge of the contrast achieved in the image and comprises a certain marking. This can then be used for the detection of surface defects in a reflection arrangement.

Furthermore the pattern may be generated by a laser line projection, wherein the laser projector, for a sufficiently quick movement of the laser light, can also be used for the two-dimensional illumination. Also the laser beam may be widened for illumination possibly by means of a beam splitter with a suitable optic, in order to generate areal illumination in addition to the line projection.

In all above-mentioned variants the illuminating unit is able to generate a light-dark field illumination.

According to the invention it is particularly preferable if the projected pattern and the illuminated surface in the captured image comprise different brightnesses in the area surrounding the projected pattern, wherein the projected pattern and/or the illuminated surface do not lie on the edge (boundary) of the contrast resolvable by the area image sensor. This allows both areas of the captured image, i.e. both the area of the projected pattern and the area illuminated as normal to be evaluated simultaneously for reflectively recognizable surface defects. For preference the patterns, even when configured as a line, may have an areal shape, i.e. the extension of the pattern in direction of its shortest extension covers several pixels of the area image sensor and/or of the image in the direction of movement. This means that the projected line also has an areal shape. Evaluation of the geometry (for determining the depth information) may, according to the invention, preferably be effected along the contrast transition of pattern and illuminated surface, which in the captured image is easily recognizable. Preferably the patterns are brighter than the rest of the illuminated surface. Projection of the bright pattern can be achieved in a particularly easy manner by using a separate projection unit which is also movable relative to the surface illuminating unit. In principle, it is also possible to use a combined projection and illuminating unit by using appropriate filters, for example.

According to a further development of the method proposed according to the invention provision may be made for capturing the projected pattern and the illuminated surface, i.e. the area of the surface of the object illuminated by the illuminating unit in the same image of the area image sensor. In this way evaluation of the depth profile and detection of surface defects can be effected in the same image thereby avoiding any expenditure for ascertaining geometric relationships between the two-dimensional image for the detection of surface defects and the three-dimensional image for determining the position of the pattern profile, i.e. determining the depth profile of the surface. Establishing this geometric relationship is also called image registration, for which in particular less computing is required while achieving a higher accuracy because geometric relationships for assigning the reflection information to the depth information can no longer produce errors. By integrating both the intensity sensor and the depth sensor in the same illuminating and camera unit it is possible to construct a low-cost and space-saving sensor, a fact which in many places, in particular in cramped assembly lines, opens up the possibility for integrating a depth sensor in the manufacturing process of the object to be inspected.

According to the invention provision may further be made for the image capture and the movement of the object to be coordinated in such a way that the object feed is exactly one image line of the area image sensor between two successive pictures taken, preferably at least in the area of the projected pattern, or in that part of the pattern used for position determination, for example a marked line for a stripe projection consisting of several lines or another marked image area. In this way it is possible to achieve a complete depth profile of the entire surface and a simple indexing of the surface for locating the different surface areas. One image line may preferably comprise the height of one pixel or of several adjacent pixels, depending on the desired resolution.

No expenditure now occurs for an image registration, i.e. for ascertaining the geometric relationships between the two-dimensional image for evaluating the reflection properties and the three-dimensional image for creating the depth profile, because the color and depth information in the area image sensor are already associated pixel-accurately with each other, wherein pixel-accurate means one pixel or an area of combined pixels. As a result the image registration section no longer represents a possible error source in the data analysis. In particular for a method designed in this way it makes sense to associate a selected surface area with multi-channel image information, of which one channel contains the location-dependent depth information and a further channel or several further channels contain the location-dependent color information. Thus a N+1-channel image is already available in the area image sensor, where the first channel contains the depth information $T(r,c)$ at the pixel $(r,c)$ and the other channels $K$, contain the information on the location-dependent reflection properties $R_K(r,c)$ of the surface at the pixel $(r,c)$.

Color information, in this context, may be the overall intensity (e.g. of a monochrome or a grey-scale image) and/or the intensity associated with individual colors (color image), wherein color is understood to mean a wavelength-selective selection from the overall wavelength spectrum, which in addition to the usual colors red, green, blue, may also comprise infrared, for example. When using a RGB color camera (red, yellow, blue) the resulting image would comprise e.g. the four channels R, R, G and B (depth, red, green and blue). The first channel therefore represents the depth information as defined by the invention and the other channels respectively represent the red, green and blue portions of the spectrum of the color picture. If an infrared channel I is added, a five-channel image results which includes the channels T(depth), T(red), G(green), B(blue) and I(infrared).

According to the invention the selected surface area may correspond, at least in a marked image area, to just one pixel of the area image sensor or a combination of several pixels of the area image sensor. As described above, it is particularly advantageous if the multi-channel image information is already associated in the area image sensor with individual image areas, such as by a microprocessor provided in the area image sensor for controlling the same. This leads to synergies during evaluation and lends real-time capability to the above-described method and the device adapted for carrying out this method.

Since the registration problem is thus solved through integrating the color and depth information with the same illuminating and camera unit, computing costs no longer occur nor can any inaccuracies connected with a subsequent association of color image information and depth information. Right from the beginning coordinated registered information is available, so that based on the use of this information in conjunction with the chain of analyses, synergies result for the inspection of surfaces and for the validation of surface inspection results, in which this additional information is utilized.

The invention further relates to a device for the inspection of surfaces of an examined object according to claim 11. According to the invention this device is equipped with an illuminating unit for illuminating the surface, a projection unit for projecting a pattern onto the surface, an area image sensor for capturing an image of the illuminated surface and the projected pattern, an image analysis unit for the detection of surface areas as defect anomalies and a transport unit for moving the surface relative to the area image sensor, wherein the illuminating unit, the projection unit, the area image sensor and/or the transport unit are arranged for performing the above-described method or parts thereof. To this end the individual units may comprise microprocessors and/or are connected with a common microprocessor which is adapted to run programs for performing the method or parts thereof.

In essence the invention therefore consists of a combination of suitable sensor components for a simultaneous comprehensive capture of geometry and reflection properties of extensive surfaces in a sensor and a method to fuse and simultaneously analyze the geometry and reflection data in order to improve defect detection and defect localization performance of automation-supported and fully automatic surface inspection systems.

BRIEF DESCRIPTION OF THE DRAWINGS

Further features, advantages and possible applications of the present invention are disclosed in the description below of exemplary embodiments and in the drawings. All features described and/or pictorially illustrated, on their own or in any combination, form the subject of the present invention, independently of their summary in the claims and references thereto.

DETAILED DESCRIPTION OF THE INVENTION

Figure 1:
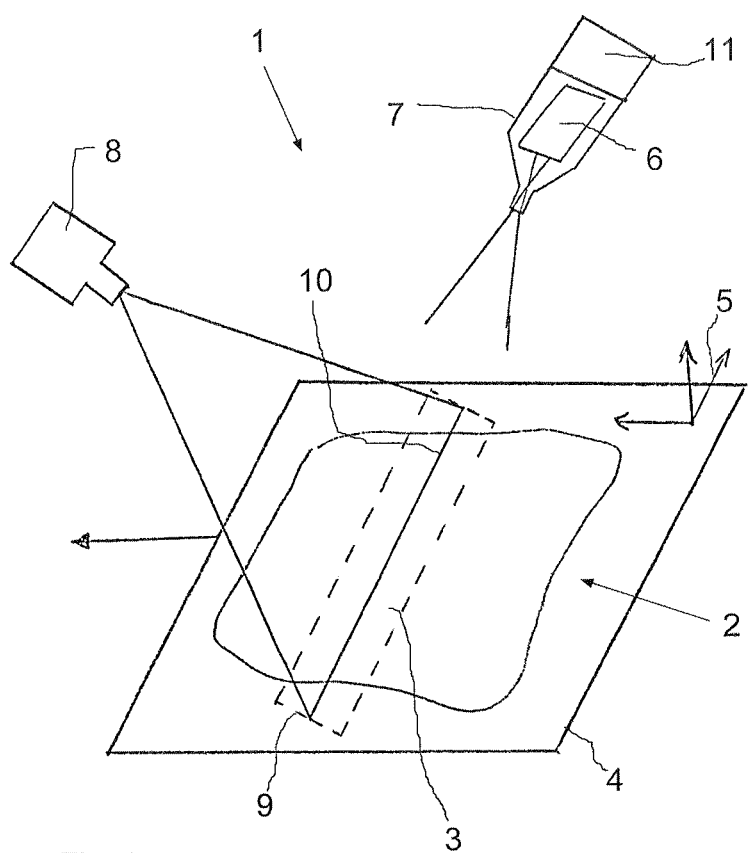
FIG. 1 shows a three-dimensional schematic view of a preferred embodiment of a device according to the invention for performing the proposed method.

FIG. 1 shows a device 1 according to the invention for the inspection of surfaces 3, i.e. of at least one surface 3 of an object 2 examined or to be examined. The object 2 is arranged on a transport unit 4 calibrated three-dimensionally on a stationary coordinate system 5, and by which the object 2 with the surface 3 is or can be moved past the area image sensor 6 of a camera 7. During this process the camera 7 takes pictures of the surface 3 of the object 2, precisely in the area, in which the surface 3 is illuminated by a combined illuminating and projection device 8, as indicated by the illuminated area 9 in FIG. 1, shown as a broken line. In this illuminated area 9, once a picture has been taken of the surface 3 by the camera 7 or by the area image sensor 6 of the camera, the reflection properties of the surface 3 are evaluated.

In the example shown a line 10 can be seen in the illuminated area 9, which is projected as a pattern by the combined illuminating and projection device 8 in this area. This means that a picture is also taken of the stripe pattern in form of a line 10 projected onto the surface 3 to be scanned by means of the matrix camera 7 with the area image sensor 6, whilst the object 3 is being moved past the scanning unit formed of the camera 7 and the illuminating and projection device 8. The picture is taken so quickly that in two successive pictures the object is advanced by exactly one picture row height of the area image sensor 6. The picture row height may correspond to just the height of one or several adjacent pixels of the area image sensor 6.

Since the camera 7 and the illuminating and projection device 8 are calibrated three-dimensionally on the marked coordinate system 5, a height profile can be determined in the resulting image with the aid of triangulation algorithms, and in the same picture in a special image area which corresponds to the illuminated area 9, a two-dimensional image can be captured, in which surface anomalies are detected as defect areas.

In the example shown the projected pattern 10 and the illuminated area 9 are provided in one area. Depending of the configuration of the illuminating and projection device 8 and the selected projection pattern, these areas can alternatively be generated separately and/or by a laser line projection.

The data supplied by the area image sensor 6 is evaluated in an image analysis unit 11 connected to the camera, in which the image generated by the area image sensor 6 is available as N-channel image information for a selected image area, e.g. one pixel or several combined pixels. Thus for each image area both the depth information and the respective reflection properties which include infrared properties in the notation of the invention are available as multi-channel image information.

These raw data supplied by the area image sensor 7, i.e. the reflection information and the depth information, is characterized and prepared in a first process step called preliminary processing with the aim of reliably locating and classifying surface anomalies. This, in particular, includes an estimate of parameters regarding signal quality, the application of processes for image restoration and image improvement, such as suppression of measurement noise or contrast highlighting and rectification of any captured perspective images.

Whilst known surface inspection systems have only access to information of the color image itself, the invention utilizes connotations between color channels and depth channels for data preparation. For example, information on local surface inclines derived from the depth image for brightness correction of the color channels is used for compensating for intensity variations resulting from inclines. The benchmark variations of the color image derived from the depth map are used for rectifying the color image, and surface curvatures derived from the depth map are used for constructing smoothing filters for the reconstruction of the color image. The color image itself is in turn utilized for creating hypotheses on the position and orientation of surface anomalies in order to smooth the depth map.

Figure 2:
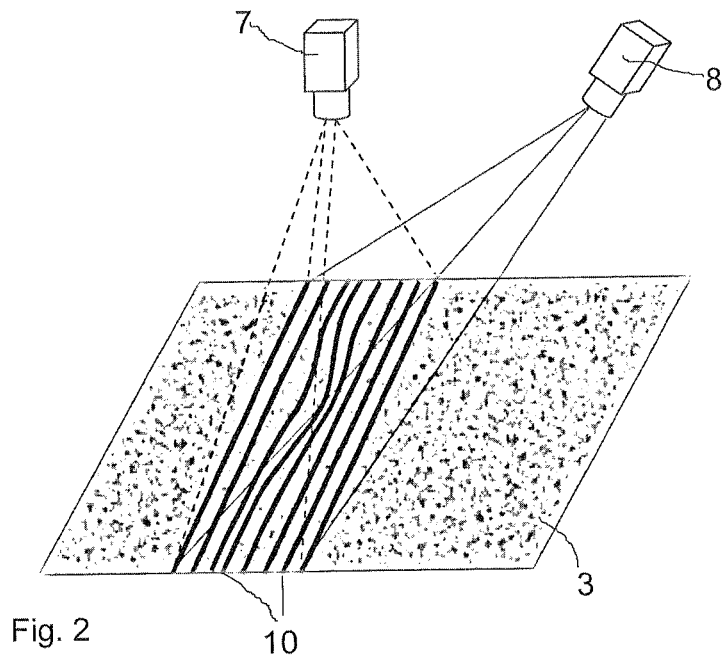
FIG. 2 shows a picture taken of the surface according to a first embodiment.

FIG. 2 shows a picture taken by the area image sensor 6 of the camera 7, which represents the illuminated area 9 of the surface 3, i.e. the illuminated surface 3 including the projection of the pattern 10, which consists of several parallel lines. For a planar surface 3 the lines of the pattern 10 would be parallel also in the image. The distortion of the lines of pattern 10 are an indication for their being a depth structure in the surface 3, and this is also evaluated according to the invention. In FIG. 2 the lines of the pattern 10 are formed as dark narrow areas in the otherwise illuminated area 9 of the surface 3, which make the depth information very clear. In the area of the dark stripes however, which in the image lie at the dark edge of the contrast area of the image and in which hardly any structure is recognizable, hardly any surface defects can be recognized which could be captured through reflection.

Figure 3:
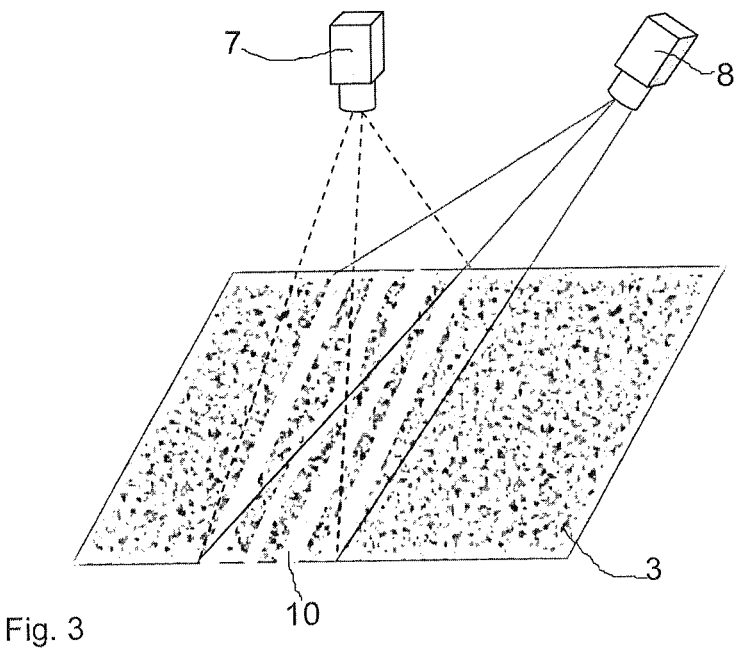
FIG. 3 shows a picture taken of the surface according to a second especially preferred embodiment of the proposed method according to the invention.

This is why an especially preferred embodiment shown in FIG. 3 is provided where the projected pattern 10 and the illuminated surface 3 in the picture taken comprise different brightnesses, wherein the projected pattern 10 and/or the illuminated surface 3 do not lie at the edge of the contrast resolvable by the area image sensor 6. Here the lines of the pattern 10 can be recognized as stripes which are brighter even than the illuminated surface. In addition the lines are shown as wide stripes in an areal form in the sense that they are represented as several pixels by the area image sensor 6. In this arrangement reflectively recognizable defects can be recognized in the area of the pattern 10 in the same image of the area image sensor 6, which is also used for ascertaining the depth information. Evaluation of the depth information is preferably effected along the contrast transition from the illuminated surface 3 to the lines of the pattern 10.

According to the invention the stripes of the pattern 10 in this arrangement also can, of course, be darker then the illuminated surface 3.

In a second evaluation step called detection the system proposed according to the invention utilizes the depth information together with the reflection information for locating surface anomalies. A new detection algorithm is used which derives a uniform set (uniform in local windows) of surface characteristics from the color and depth information for this environment, such as defect depth, defect volume, curvature values. Based on these characteristics a decision is made by means of a binary decision process, whether the locally adjacent signal pattern is to be regarded as a defect or not. The decision process is adaptive, i.e. it adapts to the signal characteristic in that it links the applied decision rules e.g. with measurements for characterizing the signal quality. In addition detection algorithms are used for locating surface anomalies with a marked shape, e.g. point-shaped or line-shaped anomalies, and these algorithms look for point or line structures in the depth image. Surface curvature measurements are used for this, which are derived from the depth image.

In a further evaluation step called segmentation the depth information is used together with reflection information for segmenting surface anomalies. A new segmentation process is used for three-dimensional registered color images which is adaptive, i.e. which adapts to the signal characteristic in that it links the applied decision rules with e.g. measurements for characterizing the signal quality.

In a further evaluation step called feature extraction the method proposed according to the invention supplements the feature space used from the analysis of color images (intensity images) by further features of the surface derived from the depth image. To this end, for the combined color and depth image, it initially derives once more all the features already known from the color image analysis (intensity images) thereby doubling the overall number. In addition further features are determined from the depth image, which are based on special properties of the depth image, such as the defect volume or the ratio between defect surface and defect height. Furthermore features are generated which selectively link the information of the color image (intensity image) with the information of the depth image, for example the variant of the height lift of a defect weighted with the image brightness.

Classification of surface defects is based on the above-explained extended feature vector, in which there may be 300 and more properties of a defect. Due to the multitude of these features selective classification processes are used, which perform a feature detection and/or an orthogonalization of the feature space.

When locating defects the invention utilizes the depth information together with the information for improving accuracy, with which the position of surface anomalies is ascertained in relation to the edges of the inspected object. An initial improvement is achieved by integrating the depth information with the processes for detecting and locating the material edge. Whilst with conventional surface inspections only the color information is utilized and edge recognition is supported as a model of the manifestation of the material edge in the image, the material edge can be derived much more directly from the depth image using much weaker assumptions and with greater reliability. Also the nature of the background has hardly any influence on the determination of the position of a material edge.

Certain surface defects are characterized in that they consist of a group of individual events. For such defects the individual events must be agglomerated to form a master defect using suitable methods. This is performed in the evaluation step for defect agglomeration. The invention uses the depth information in order to summarize adjacent anomalies with the same depth profile and the same defect class to form a master defect.

Apart from the improvement in inspection performance achieved by the above-described features, the method and the device proposed according to the invention open up new fields of application of automatic surface inspection, which up to now were out of reach for conventional surface inspection systems. These new applications according to the invention refer to e.g. measuring planeness and thickness, measuring the three-dimensional material structure, measuring roughness and porosity, three-dimensional inspection of patterned surfaces (e.g. metal sheets) including measuring embossing depth, automatic reading of embossing features, measuring the depth of embossing, three-dimensional welding seam inspection, simultaneous surface and form inspections (e.g. rail inspections) and/or recognition of periodically occurring material thickness fluctuations.

Together with the newly won depth information new possibilities also result for the manufacturing process of the object in process checking and process control, such as selective material machining as regards width and depth, selective roll pressure control depending on surface profile and/or selective varnish and/or filler application depending on surface roughness.

Moreover the invention offers the possibility of clearly depicting surface defects to the human viewer in a three-dimensional representation. Defects noticed by inspection personnel only through touch or a so-called finger test, can now be clearly visualized in a three-dimensional representation. This simplifies evaluation of the inspection results.

REFERENCE SYMBOLS

1 Device for the inspection of surfaces of an object to be examined
2 object to be examined
3 surface
4 transport unit
5 coordinate system
6 area image sensor
7 camera
8 illuminating and projection device
9 illuminated area
10 pattern, line
11 image analysis unit

What is claimed is:

1. A method for the inspection of surfaces of an examined object, comprising the steps of:
   calibrating an area image sensor three-dimensionally onto a selected coordinate system;
   calibrating an illuminating unit three-dimensionally onto the selected coordinate system;
   illuminating a surface of an object using the calibrated illuminating unit;
   capturing images of the illuminated surface using the calibrated area image sensor while the surface is moved relative the calibrated area image sensor; and
   forwarding the captured images to an image analysis unit configured to ascertain surface anomalies as defect areas in a detection as well as to delimit, if required, the defect areas in a segmentation relative to other defect areas or against an image background, to summarize defect areas belonging together in a regional analysis, to derive characteristic defects from defect areas or defect regions in a feature extraction, or both;
   wherein the step of illuminating includes projecting a pattern onto an area of the surface of the object, which area is captured by the calibrated area image sensor in the step of capturing;
   wherein a position of defined pattern portions of the projected pattern on the surface of the object is determined in the selected coordinate system;
   wherein data comprising the captured projected pattern and the captured illuminated surface is supplemented based on a simultaneous capture and analysis of two-dimensional images representing reflection properties of the surface of the object and three-dimensional images representing a three-dimensional geometry of the surface of the object, as surface topography; and
   wherein the projected pattern and the illuminated surface in the captured image comprise different respective brightnesses in an area of the surface of the object surrounding the projected pattern and wherein neither the projected pattern, nor the illuminated surface lay on a boundary of a contrast resolvable by the area image sensor.

2. The method according to claim 1, wherein a depth profile of the surface is ascertained from the positions of the pattern portions.

3. The method according to claim 1, wherein the pattern projected is a line pattern or a stripe pattern.

4. The method according to claim 1, wherein the pattern is projected as a bright area with dark intermediate spaces.

5. The method according to claim 1, wherein the pattern is projected as a dark area with bright intermediate spaces.

6. The method according to claim 1, wherein the pattern is generated by a laser line projection.

7. The method according to claim 1, wherein the projected pattern and the illuminated surface in the captured image comprise different brightnesses, and wherein neither the projected pattern, nor the illuminated surface lie on a boundary of a contrast resolvable by the area image sensor.

8. The method according to claim 1, wherein the projected pattern and the illuminated surface are captured in a single image by the area image sensor.

9. The method according to claim 1, wherein capturing the image and moving the object are coordinated in such a way, that an object feed between two successive takes is exactly one image line of the area image sensor.

10. The method according to claim 1, wherein a selected surface area has a multi-channel image information associated with it, of which one channel contains location-dependent depth information and one further channel or several further channels contain location-dependent color information.

11. The method according to claim 10, wherein association of the multi-channel image information takes place as early as in the area image sensor.

12. A device for inspecting surfaces of an examined object with an illumination device for illuminating a surface, a projection unit for projecting a pattern onto the surface, an area image sensor for capturing a picture of the illuminated surface and of the projected pattern, an image analysis unit for detecting surface areas as defect anomalies and a transport unit for moving the surface relative to the area image sensor, wherein the illumination device, the projection unit, the area image sensor, the image analysis unit, and the transport unit are arranged for carrying out a method comprising the steps of:

calibrating the area image sensor three-dimensionally onto a selected coordinate system;

calibrating the illuminating unit three-dimensionally onto the selected coordinate system;

illuminating the surface of the object using the calibrated illuminating unit;

capturing images of the illuminated surface using the calibrated area image sensor while the surface is moved relative the calibrated area image sensor; and forwarding the captured images to an image analysis unit configured to ascertain surface anomalies as defect areas in a detection as well as to delimit, if required, the defect areas in a segmentation relative to other defect areas or against the image background, to summarize defect areas belonging together in a regional analysis, to derive characteristic defects from defect areas or defect regions in a feature extraction, or both;

wherein the step of illuminating includes projecting a pattern onto an area of the surface of the object, which area is captured by the calibrated area image sensor in the step of capturing;

wherein a position of defined pattern portions of the projected pattern on the surface of the object is determined in the selected coordinate system; and wherein data comprising the captured projected pattern and the captured illuminated surface is supplemented based on a simultaneous capture and analysis of two-dimensional images representing reflection properties of the surface of the object and three-dimensional images representing a three-dimensional geometry of the surface of the object, as surface topography; and wherein the projected pattern and the illuminated surface in the captured image comprise different respective brightnesses in an area of the surface of the object surrounding the projected pattern and wherein neither the projected pattern, nor the illuminated surface lay on a boundary of a contrast resolvable by the area image sensor.

* * * * *